(12) United States Patent
Osumi (10) Patent No.: US 12,075,318 B2
(45) Date of Patent: Aug. 27, 2024

(54) WIRELESS SYSTEM, CONTROL METHOD OF WIRELESS SYSTEM, AND NON-TRANSITORY COMPUTER READABLE MEDIUM STORING PROGRAM FOR CONTROLLING WIRELESS SYSTEM

(71) Applicant: NEC Platforms, Ltd., Kawasaki (JP)

(72) Inventor: Fumihiro Osumi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 337 days.

(21) Appl. No.: 17/608,790

(22) PCT Filed: Apr. 8, 2020

(86) PCT No.: PCT/JP2020/015769
§ 371 (c)(1),
(2) Date: Nov. 4, 2021

(87) PCT Pub. No.: WO2020/241066
PCT Pub. Date: Dec. 3, 2020

(65) Prior Publication Data
US 2022/0322056 A1 Oct. 6, 2022

(30) Foreign Application Priority Data
May 28, 2019 (JP) .................................. 2019-099358

(51) Int. Cl.
*H04W 4/00* (2018.01)
*H04W 4/40* (2018.01)
(Continued)

(52) U.S. Cl.
CPC ............... *H04W 4/40* (2018.02); *H04W 4/80* (2018.02); *H04W 12/06* (2013.01); *H04W 76/38* (2018.02); *H04W 84/12* (2013.01)

(58) Field of Classification Search
None
See application file for complete search history.

(56) References Cited

U.S. PATENT DOCUMENTS

| 8,223,731 B2 * | 7/2012 | Lee ..................... H04W 12/041 370/331 |
| 2002/0147926 A1 * | 10/2002 | Pecen ................. H04L 63/0853 726/7 |

(Continued)

FOREIGN PATENT DOCUMENTS

| CN | 105007579 A | 10/2015 |
| CN | 109644133 A | 4/2019 |

(Continued)

OTHER PUBLICATIONS

International Search Report for PCT Application No. PCT/JP2020/015769, mailed on Jul. 21, 2020.

(Continued)

*Primary Examiner* — Gerald A Smarth (57) ABSTRACT

A wireless system includes a terminal owned by a passenger who rides on a vehicle, a key device mounted on the vehicle and connected to the terminal by a first connection method, an authentication server for returning whether or not authentication is successful to the terminal in response to an authentication request from the terminal, and a wireless router connected to the terminal by a second connection method for performing communication from the terminal to the authentication server via a communication line. The wireless router includes a timer for disconnecting the connection with the communication line when the authentication by the authentication server is not performed within a predetermined time period, and when the authentication server authenticates the terminal, the timer is canceled and the connection with the communication line is continued.

10 Claims, 7 Drawing Sheets

(51) Int. Cl.
 *H04W 4/80* (2018.01)
 *H04W 12/06* (2021.01)
 *H04W 76/38* (2018.01)
 *H04W 84/12* (2009.01)

(56) References Cited

U.S. PATENT DOCUMENTS

| | | |
|---|---|---|
| 2016/0094948 A1 | 3/2016 | Kodan et al. |
| 2017/0093536 A1 | 3/2017 | Yoganathan et al. |
| 2018/0309766 A1* | 10/2018 | Marnfeldt ............... G06F 8/654 |
| 2019/0001926 A1 | 1/2019 | Arakawa et al. |
| 2019/0191309 A1 | 6/2019 | Kweon et al. |
| 2019/0297487 A1* | 9/2019 | Muñoz Sanchez ......................... H04L 41/5029 |
| 2020/0221544 A1 | 7/2020 | Nishizaki et al. |

FOREIGN PATENT DOCUMENTS

| | | | | |
|---|---|---|---|---|
| EP | 3678450 A1 * | 7/2020 | ......... | H04L 63/0428 |
| JP | 2004-280310 A | 10/2004 | | |
| JP | 2013-247614 A | 12/2013 | | |
| JP | 2014-123843 A | 7/2014 | | |
| JP | 2016-158087 A | 9/2016 | | |
| JP | 2017-034690 A | 2/2017 | | |
| JP | 2017-225184 A | 12/2017 | | |
| JP | 2018-537017 A | 12/2018 | | |
| JP | 2019-080168 A | 5/2019 | | |
| WO | WO-2012068526 A1 * | 5/2012 | ......... | G05D 23/1917 |
| WO | WO-2017084446 A1 * | 5/2017 | | |
| WO | WO-2017130912 A1 * | 8/2017 | ............. | G06F 1/163 |

OTHER PUBLICATIONS

CN Office Action for Chinese Patent Application No. 202080039112.1, mailed on Feb. 27, 2024 with English Translation.

* cited by examiner

WIRELESS SYSTEM, CONTROL METHOD OF WIRELESS SYSTEM, AND NON-TRANSITORY COMPUTER READABLE MEDIUM STORING PROGRAM FOR CONTROLLING WIRELESS SYSTEM

This application is a National Stage Entry of PCT/JP2020/015769 filed on Apr. 8, 2020, which claims priority from Japanese Patent Application 2019-099358 filed on May 28, 2019, the contents of all of which are incorporated herein by reference, in their entirety.

TECHNICAL FIELD

The present disclosure relates to a wireless WAN (Wide Area Network)-wireless LAN (Local Area Network) router apparatus (hereinafter referred to as a wireless router apparatus) for controlling activation of wireless WAN and restricting its use. In particular, the present disclosure relates to a method for limiting the use of a wireless system in a vehicle owned by a connection service subscriber in a state in which a USB type wireless router apparatus, which is assumed to be connected to a USB port in the vehicle, is used and a condition of use is that there is a terminal such as a smartphone owned by the connection service subscriber.

BACKGROUND ART

In order to connect to the Internet over a wireless WAN (such as Long Term Evolution (LTE) or WiMAX), you almost always have to sign a contract with a carrier and pay for a communication fee. In addition, with the recent spread of connected cars, a method of collecting information about a vehicle through a wireless WAN line is spreading.

In this case, the automobile manufacturer may contract with a user to collect driving information from the vehicle owned by the user, and the automobile manufacturer may bear the charge for using the WAN line. Under such circumstances, by using a wireless router as a device for WAN line connection, not only the collection of vehicle information but also Internet connection by wireless LAN in the vehicle can be possible, and the Internet connection service can be provided to the contract user.

CITATION LIST

Patent Literature

Patent Literature 1: Japanese Unexamined Patent Application Publication No. 2004-280310
Patent Literature 2: Japanese Unexamined Patent Application Publication No. 2014-123843
Patent Literature 3: Japanese Unexamined Patent Application Publication No. 2017-225184

SUMMARY OF INVENTION

However, the automobile manufacturer wants to limit the use to the subscribers and vehicles registered by the subscribers. On the other hand, as a form of a device of a wireless router device, a device fed from a USB is easy to handle, but since the USB is a general-purpose interface, an Internet line can be used when the device is connected to other vehicles, PCs, etc., and it has been difficult to limit users and a range of use.

An object of the present disclosure is to provide a wireless system that can only be used in a vehicle and with a subscriber present.

A wireless system according to an example aspect includes: a terminal owned by a passenger who rides on a vehicle; a key device mounted on the vehicle and connected to the terminal by a first connection method; an authentication server configured to return whether or not authentication is successful to the terminal in response to an authentication request from the terminal; and a wireless router connected to the terminal by a second connection method and is configured to perform communication from the terminal to the authentication server via a communication line. The wireless router includes a timer configured to disconnect the connection with the communication line when the authentication by the authentication server is not performed within a predetermined time period, and when the authentication server authenticates the terminal, the timer is canceled and the connection with the communication line is continued.

A method of controlling a wireless system according to another example embodiment includes: connecting key device to a terminal owned by a passenger on a vehicle by a first connection method; connecting a wireless router to the terminal by a second connection method; returning, by an authentication server, whether or not authentication is successful to the terminal in response to an authentication request sent from the terminal to the authentication server via a communication line; and when the authentication by the authentication server is not performed within a predetermined time period set by a timer, disconnecting the connection with the communication line by the wireless router whereas when the terminal is authenticated by the authentication server, canceling the timer and continuing the connection with the communication line by the wireless router.

A non-transitory computer readable medium storing a control program of a wireless system causing, when a terminal connected to a key device by a first connection method and connected to a wireless router by a second connection method transmits an authentication request to an authentication server via a communication line and receives a success or a failure of authentication from the authentication server, the wireless router to execute, if the terminal is authenticated by the authentication server, canceling an operation of a timer for counting in order to disconnect the communication line when the timer is not canceled within a predetermined time period.

According to the example aspects, it is possible to provide wireless system that can only be used in a vehicle and with a subscriber present.

DESCRIPTION OF EMBODIMENTS

First Example Embodiment

Figure 1:
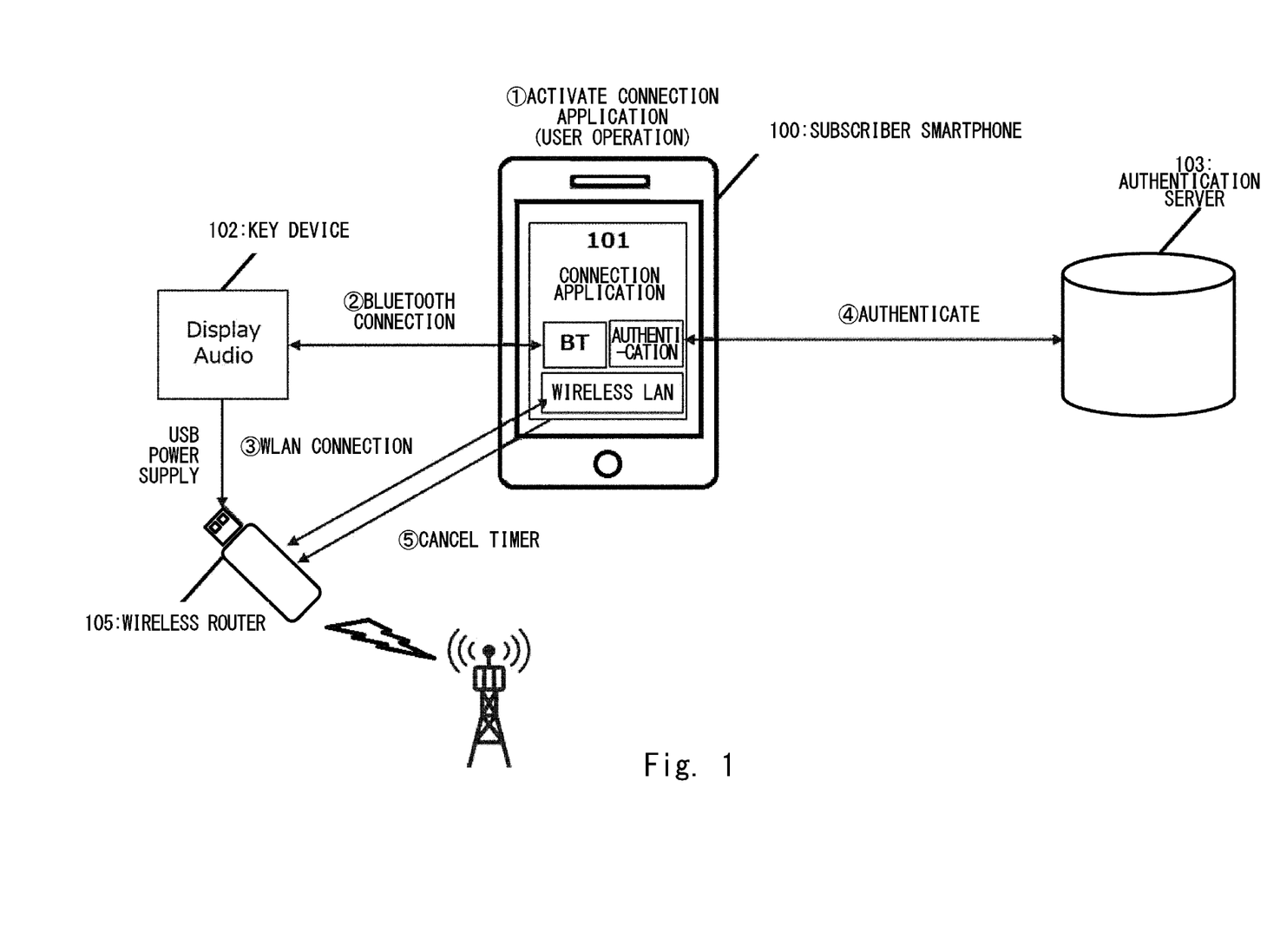
FIG. 1 is a schematic diagram of a wireless system according to a first example embodiment.
Figure 2:
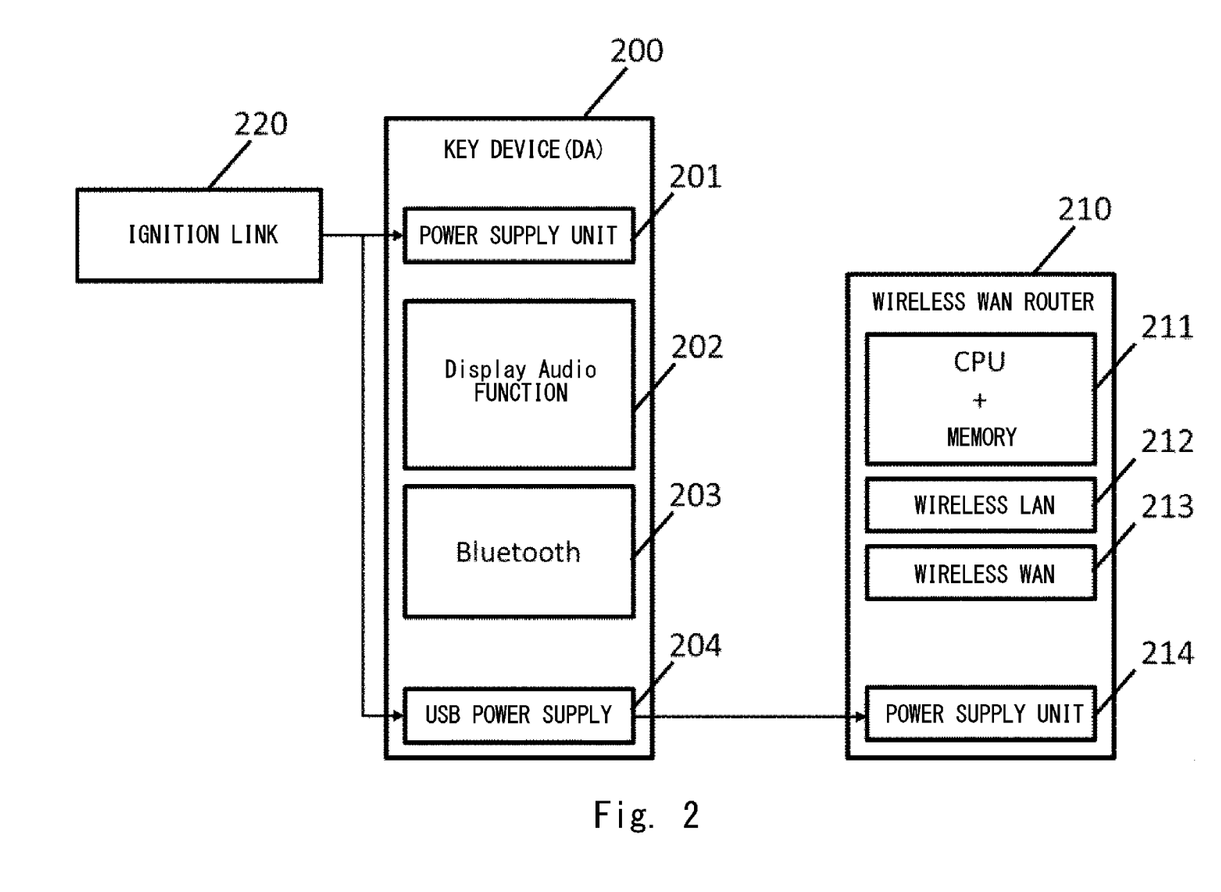
FIG. 2 shows a configuration in a vehicle according to the first example embodiment.

FIG. 1 shows an overview of the present disclosure and a configuration of a wireless system. FIG. 2 shows an example of a configuration of the wireless system disposed in a vehicle on which a person carrying a terminal rides. The configuration of the apparatus according to the present disclosure will be described below with reference to FIGS. 1 and 2.

As shown in FIG. 1, the wireless system includes a terminal 100 such as a smartphone in which a connection application 101 is installed, a key device 102 using Display Audio (DA) or the like, an authentication server 103, and a wireless router 105. In the following description, a communication line includes at least one of a WAN and a LAN. The terminal 100 will be described below as a smartphone 100.

The smartphone 100 is a terminal owned by a person who rides on a vehicle. The function of the connection application 101 installed in the smartphone 100 enables connection with the key device 102 using Bluetooth connection (a first connection method). The smartphone 100 can be connected to the wireless router 105 via a wireless LAN (a second connection method) by the connection application 101. The connection application 101 stores an ID associated with the smartphone 100. The ID is, for example, a subscriber ID unique to an owner of the smartphone 100. Further, the smartphone 100 can make an authentication inquiry to the authentication server 103 installed outside or receive an authentication result via the connection application 101.

The key device 102 is mounted on a vehicle and has a MAC address. A Display Audio (DA) 200 (see FIG. 2), which will be described in detail later, or a car navigation system may be used as the key device 102. In the following description, power is supplied from the key device 102 to the wireless router 105, and a DA is used as the key device 102.

The authentication server 103 stores in advance a combination of the subscriber ID of the smartphone 100, a MAC address of the wireless router 104 used in the vehicle, and the MAC address of the DA used as the key device 102. For example, the authentication server 103 transmits and receives data to and from the smartphone 100 via a WAN, and performs an operation for authentication. More specifically, the smartphone 100 requests the authentication server 103 for authentication, and the authentication server 103 can return whether or not the authentication is successful to the smartphone 100.

The wireless router 105 is connected to the smartphone 100 via the wireless LAN, and changes a state of WAN connection or the like based on a state of the authentication from the authentication server 103 of the smartphone 100. The wireless router 105 outputs a signal to the smartphone 100 so that the smartphone is authenticated by the authentication server 103. Furthermore, the wireless router 105 includes a timer that continues a authentication waiting state for a predetermined time period and automatically disconnects the wireless router from the communication line after the predetermined time period has elapsed. The wireless router 105 is the same as a wireless WAN router 210 shown in FIG. 2. A configuration of the wireless router 105 will be described later in detail.

As shown in FIG. 2, a vehicle is provided with the Display Audio (DA) 200 serving as the key device for limiting vehicles, the wireless WAN router 210 having wireless and WAN functions, and a linking unit 220 linked to an ignition of the vehicle.

The DA 200 includes, for example, a liquid crystal display of about 7 inches, has a function to connect to a smartphone or the like, and can execute various functions such as information display using software provided on the smartphone side. As described later, in the DA 200, an application (connection application) installed in a smartphone is used to control the WAN connection.

The DA 200 is composed of a power supply unit 201 linked with the ignition, a USB power supply 204 that can supply power to outside, a Display Audio function unit (DA function unit) 202, and a Bluetooth unit 203.

The power supply unit 201 is linked with the ignition which is a switch for controlling an engine start and an electric system of a vehicle. For example, the power supply of the DA 200 is turned on based on an operation by a passenger riding on the vehicle.

The USB power supply 204 supplies power to devices such as smartphones connected to the DA 200. For example, the USB power supply 204 provides power to the wireless WAN router 210.

The DA function unit 202 has functions such as, for example, not only reproduction of a radio or a music CD but also connection to a portable music player. The functions of the DA function unit 202 are not limited to these functions.

The Bluetooth unit 203 has a function for connecting to the smartphone 100 (see FIG. 1) using Bluetooth (registered trademark). Typically, the connection method (the first connection method) by the Bluetooth unit 203 is classified into short-range wireless communication, and has a feature that the radio wave is weaker than that of the Wifi communication or the like, and the communication can be disabled when the user is away from the vehicle. That is, the communication by the Bluetooth unit 203 can be limited within the vehicle.

The wireless WAN router 210 includes a power supply unit 214 which receives power supply from a USB power supply 204 of the DA 200, a wireless LAN communication unit 212, a wireless WAN communication unit 213 such as WiMAX and LTE, and a CPU+ memory unit 211 which can control the operation of the wireless LAN communication unit 212, the operation of the wireless WAN communication unit 213, and the timer. For example, the wireless WAN router 210 is the same as the wireless router 105 in FIG. 1.

For example, the wireless WAN router 210 can connect the terminal to the WAN by communicating with the terminal having a wireless LAN slave unit function using radio waves.

More specifically, the wireless LAN communication unit 212 has a communication function for connecting devices within a limited range using wireless radio waves to perform data communication with each other. That is, the wireless LAN communication unit 212 controls connection with the LAN network. Here, the device within the limited range is, for example, a device present inside the vehicle.

The wireless WAN communication unit 213 has a communication function for connecting a network connected to a remote location using wireless radio waves to perform data communication with each other. That is, the wireless WAN communication unit 213 has a function for connecting to the WAN such as the Internet.

The CPU+memory unit 211 controls the operations of the wireless LAN communication unit 212 and the wireless WAN communication unit 213, and functions as a WAN disconnection timer. As will be described later, the wireless WAN router 210 disconnects the connection with the WAN when a signal for canceling the WAN disconnection timer is not input within a predetermined time period.

Figure 3:
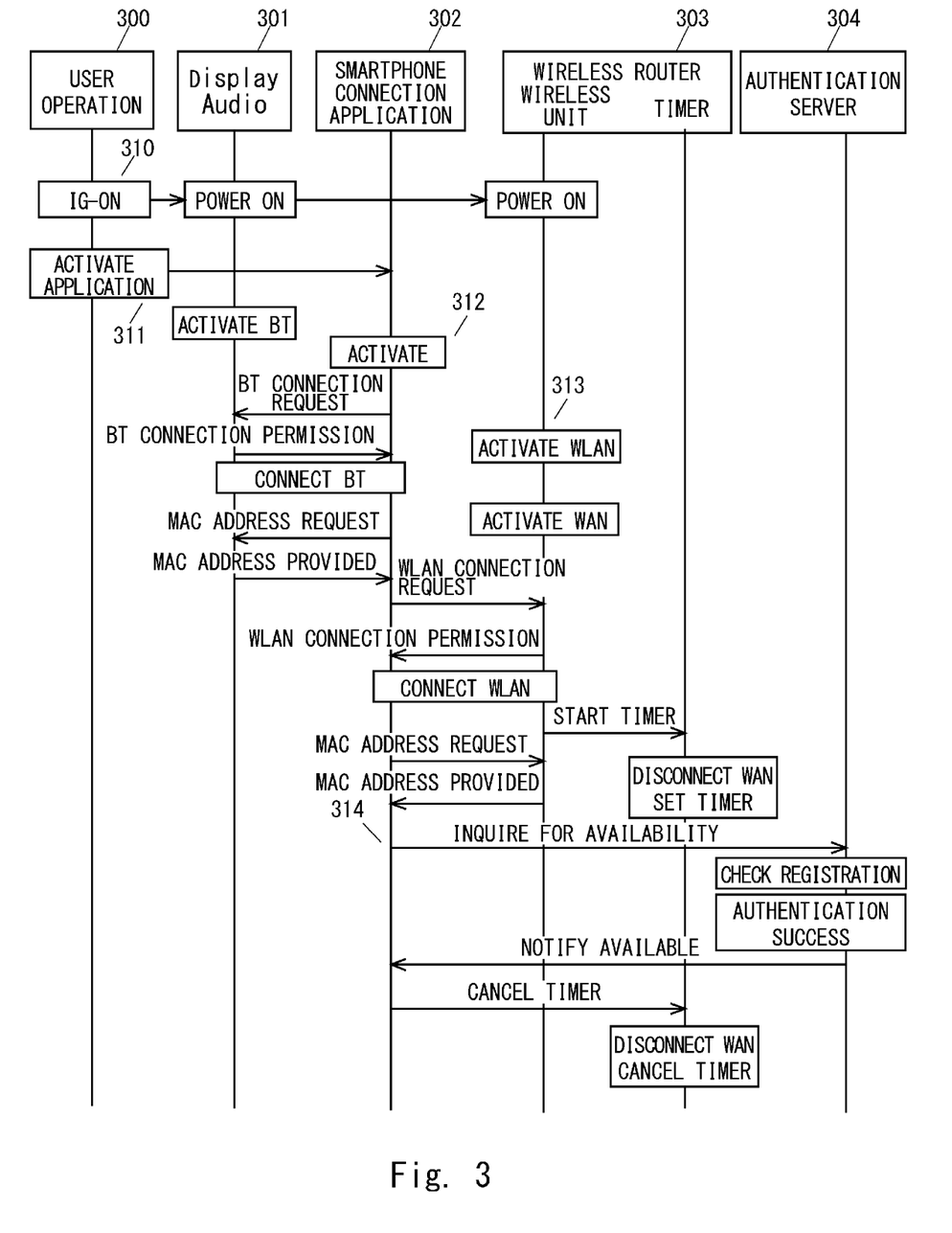
FIG. 3 is a sequence diagram when authentication is successful according to the first example embodiment.

The operation according to the example embodiment will now be described with reference to the sequence diagram shown in FIG. 3. FIG. 3 shows a case in which, when authentication is requested from the smartphone to the authentication server, authentication is successful and the WAN connection is maintained. Hereinafter, the wireless LAN will be described as a WLAN (Wireless LAN).

A Display Audio 301 in FIG. 3 corresponds to the DA 200 in FIG. 2. A smartphone connection application (connection application) 302 in FIG. 3 corresponds to the connection application 101 in FIG. 1. A wireless router 303 in FIG. 3 corresponds to the wireless router 105 in FIG. 1 and the wireless WAN router 210 in FIG. 2. An authentication server 304 in FIG. 3 corresponds to the authentication server 103 in FIG. 1.

First, when the ignition of the vehicle is turned on (310) by a user operation 300, power is supplied to the Display Audio (DA) 301. Further, power is supplied from the DA 301 to the wireless router 303 via a USB power supply. That is, the DA 301 and the wireless router 303 are activated by the user operation (311).

The connection application 302 installed in the smartphone is activated (312). Here, the connection application 302 holds ID information unique to the subscriber of the smartphone.

After the connection application 302 is activated (312), the connection application 302 requests the DA 301 for Bluetooth connection and establishes connection. After the Bluetooth connection is established, the connection application 302 acquires a Mac address of Bluetooth of the DA 301.

Next, the wireless router 303 is requested to establish WLAN connection and WLAN connection is established. After the WLAN connection is established, the connection application 302 acquires the MAC address of the wireless router 303.

After the power supply is activated (313), the wireless router 303 activates the WLAN and the WAN, establishes connection with a first wireless LAN slave unit, and sets the WAN disconnection timer. The first wireless LAN slave unit will be described as a smartphone.

After the connection application 302 completes the Bluetooth connection with the DA 301 and the connection with the wireless router 303, the connection application 302 inquires the authentication server 304 about the ID of the subscriber, the MAC address of the DA 301, and the MAC address of the wireless router 303 (314).

Note that the transmission and reception of data related to the inquiry from the connection application 302 to the authentication server 304 can be performed not by direct packet communication from the smartphone but by connection via the WAN using the wireless router 303.

The authentication server 304 checks whether registered information matches the information sent from the connection application 302, and when they match, the authentication server 304 notifies the connection application 302 of an authentication success.

Upon receiving the notification of the authentication success in the authentication server 304, the connection application 302 outputs a signal for canceling the counting performed by the WAN disconnection timer to the wireless router 303. Thus, in the wireless router 303, the WAN disconnection timer is canceled, and the wireless router 303 can be used as it is, and the state of being connected to the WAN is continued.

Next, a case in which the authentication fails when an authentication request is made from the smartphone to the authentication server and the WAN connection is disconnected will be described with reference to FIG. 4.

Figure 4:
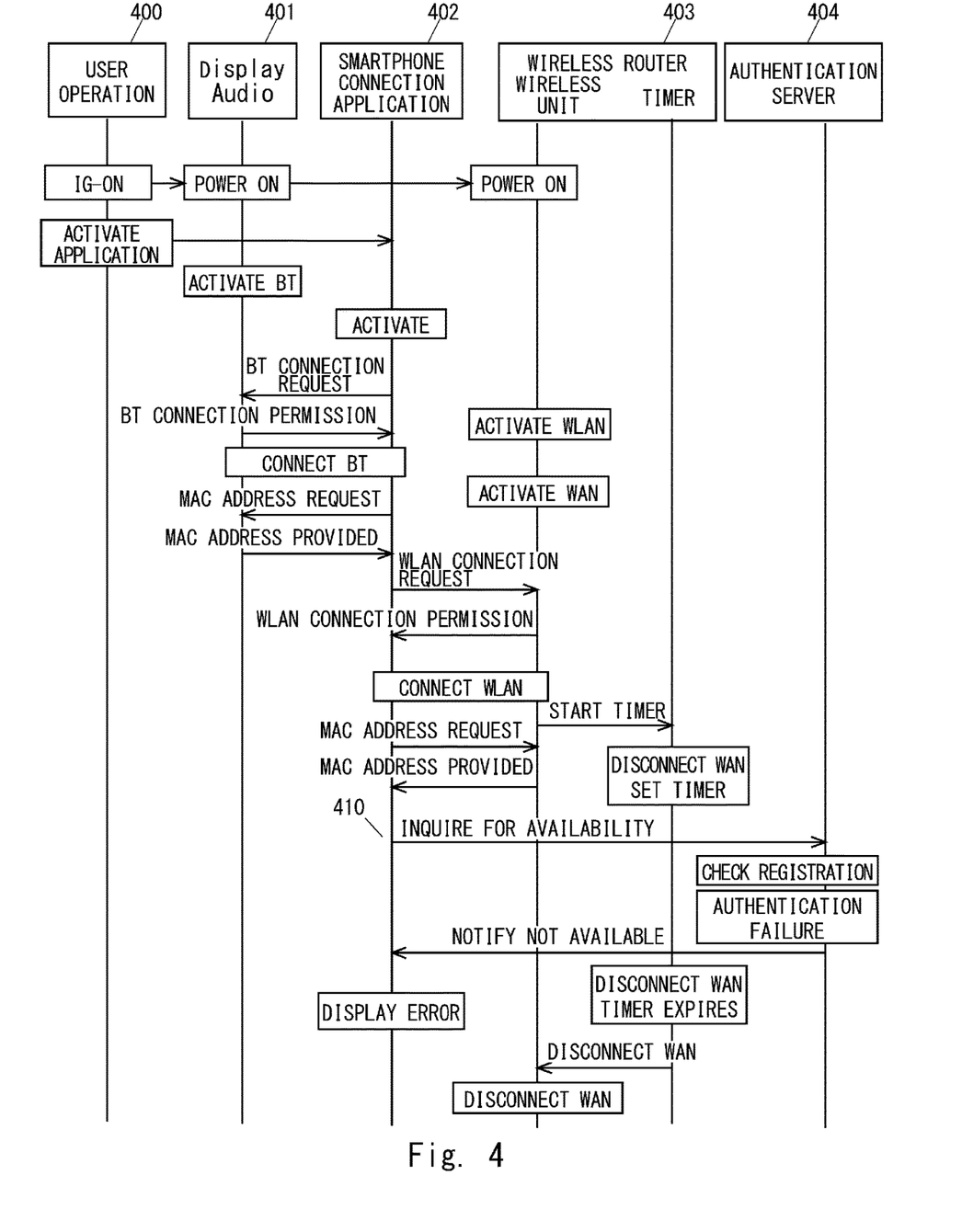
FIG. 4 is a sequence diagram when the authentication fails according to the first example embodiment.

A user operation 400, a Display Audio (DA) 401, a smartphone connection application 402, a wireless router 403, and an authentication server 404 shown in FIG. 4 correspond to the user operation 300, the Display Audio 301, the smartphone connection application 302, the wireless router 303, and the authentication server 304 shown in FIG. 3, respectively.

In FIG. 4, the operations up to an availability inquiry (410) are the same as the operations in FIG. 3.

That is, after the power supply is activated, the wireless router 403 activates the WLAN and the WAN, establishes connection with the first wireless LAN slave unit, and sets the WAN disconnection timer.

After the connection application 402 completes the Bluetooth connection with the DA 401 and the connection with the wireless router 403, the connection application 402 inquires the authentication server 404 about the ID of the subscriber, the MAC address of the DA 401, and the MAC address of the wireless router 403.

When the authentication server 404 determines that the information sent from the connection application 402 does not match registration information stored in the authentication server 404, the authentication server 404 notifies the connection application 402 of an authentication failure.

The connection application 402 notifies the user of an error indicating that the authentication is not successful.

The wireless router 403 disconnects the WAN connection after the WAN disconnection timer expires. This makes it impossible to use the WAN via the wireless router 403.

Figure 5:
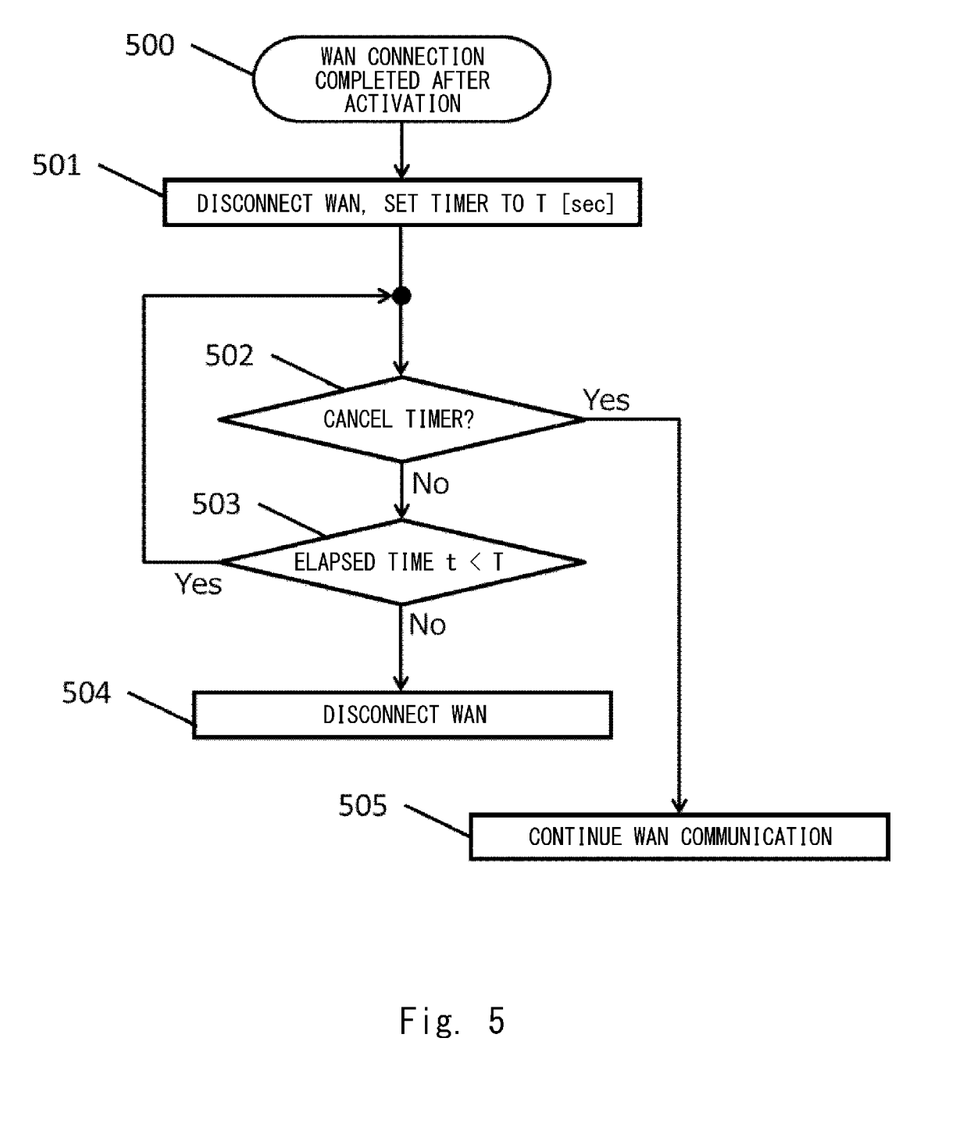
FIG. 5 is a flowchart of an operation of a wireless router according to the first example embodiment.

FIG. 5 shows a flow of the operation of the wireless router. At the time of activation of the wireless router, the WAN connection is established (500), and the WAN disconnection timer for disconnecting the WAN connection is set (501). After that, it is determined whether or not the WAN disconnection timer is canceled, and when the WAN disconnection timer is canceled (Yes in 502), the WAN connection is continued (505). When the WAN disconnection timer is not canceled (No in 502), it is determined whether or not a current elapsed time t is within a predetermined time T, and when the elapsed time t is within the predetermined time T (Yes in 503), it is repeatedly determined whether or not the WAN disconnection timer is canceled. When the elapsed time t exceeds the predetermined time T (No in 503), the WAN connection is disconnected (504).

In this way, the use of the wireless router can be limited based on the authentication performed by the authentication server. At this time, by using a DA or a car navigation fixed to a vehicle as the key device serving as an authentication key for using the WAN, the restriction range of the wireless communication use can be limited to a vehicle including such a key device.

In addition, it is possible to limit users by using the application installed in the smartphone as a condition of use. It is thus possible to provide a wireless system that can be used only in a vehicle and with a subscriber present.

Further, the authentication request from the terminal to the authentication server can be made via the wireless router. In this way, it is possible to avoid a decrease in a communication speed that may occur when packet communication is performed from the smartphone to the authentication server, and to avoid an influence when there is a communication restriction.

Furthermore, the wireless communication can be made available right after the activation of the wireless router is completed, and the use of the wireless communication can be restricted at the same time.

Second Example Embodiment

In the first example embodiment, the wireless router 105 includes the WAN disconnection timer for disconnecting the WAN. However, a LAN disconnection timer for disconnecting the LAN may be used in place of the WAN disconnection timer.

By doing so, devices which cannot be authenticated by the authentication server 103 are restricted so that such devices cannot use not only the WAN via the wireless router 105 but also the LAN constructed in the vehicle on which the user is riding.

Third Example Embodiment

In a device configuration shown in the first example embodiment, a mechanism for resetting the WAN disconnection timer can be added when the Bluetooth connection between the connection application 101 and the DA used as the key device 102 is disconnected.

Figure 6:
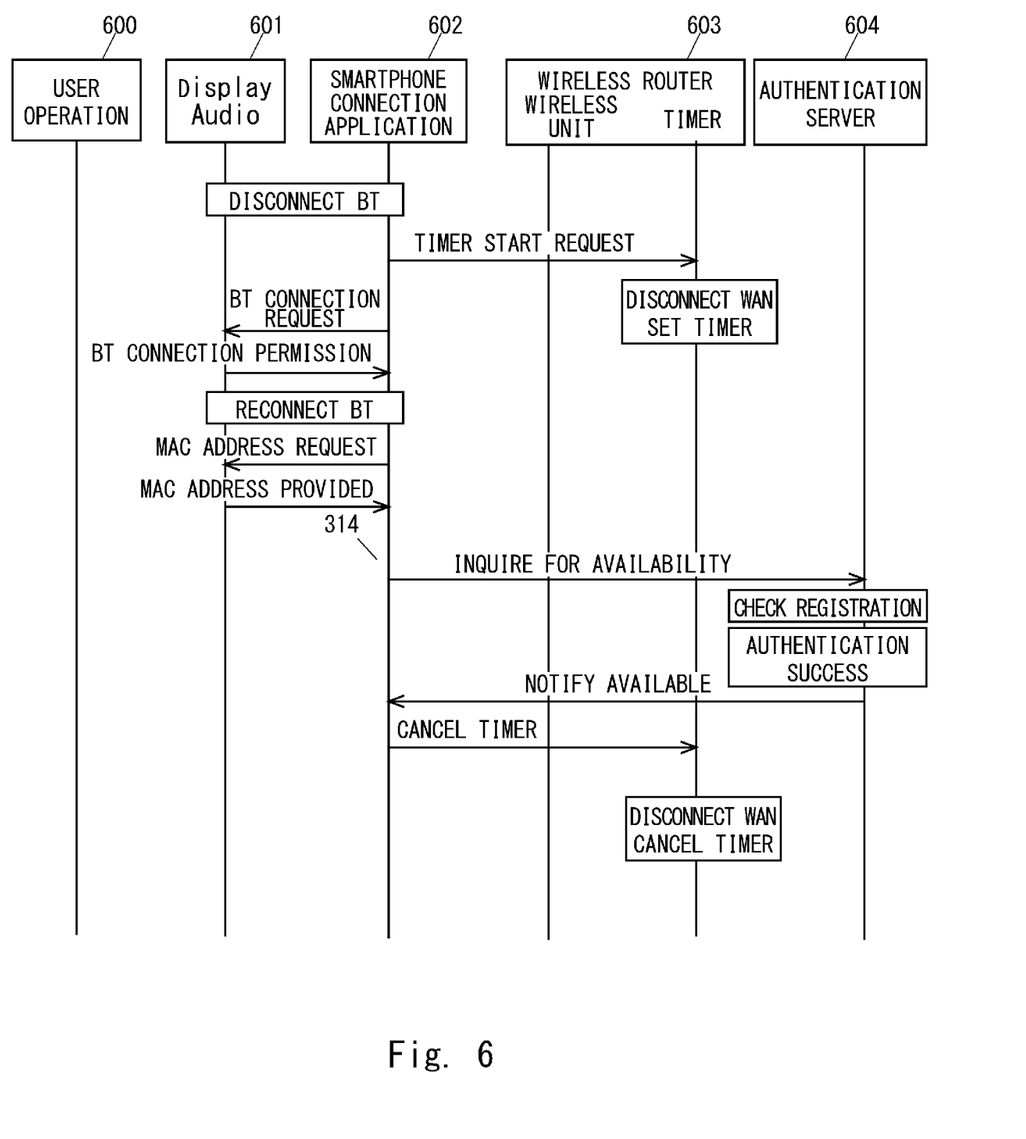
FIG. 6 is a sequence diagram according to a third example embodiment.

A user operation 600, a Display Audio (DA) 601, a smartphone connection application 602, a wireless router 603, and an authentication server 604 shown in FIG. 6 correspond to the user operation 300, the Display Audio 301, the smartphone connection application 302, the wireless router 303, and the authentication server 304 shown in FIG. 3, respectively.

As shown in FIG. 6, when Bluetooth is disconnected (610), the connection application 602 requests the wireless router 603 to start the WAN disconnection timer. The wireless router 603 sets the WAN disconnection timer based on the request to start the WAN disconnection timer.

After that, when the DA 601 and the connection application 602 are reconnected by Bluetooth, an inquiry to the authentication server 604 is made again, and when the connection is available, the WAN disconnection timer is canceled.

This allows users to stop using the wireless router when they leave with their smartphone from the DA, i.e., when they go out of the vehicle.

Fourth Example Embodiment

A device configuration according to the first embodiment further including a mechanism which provides wireless communication without requiring re-authentication when a user gets on or off a vehicle will be described.

Figure 7:
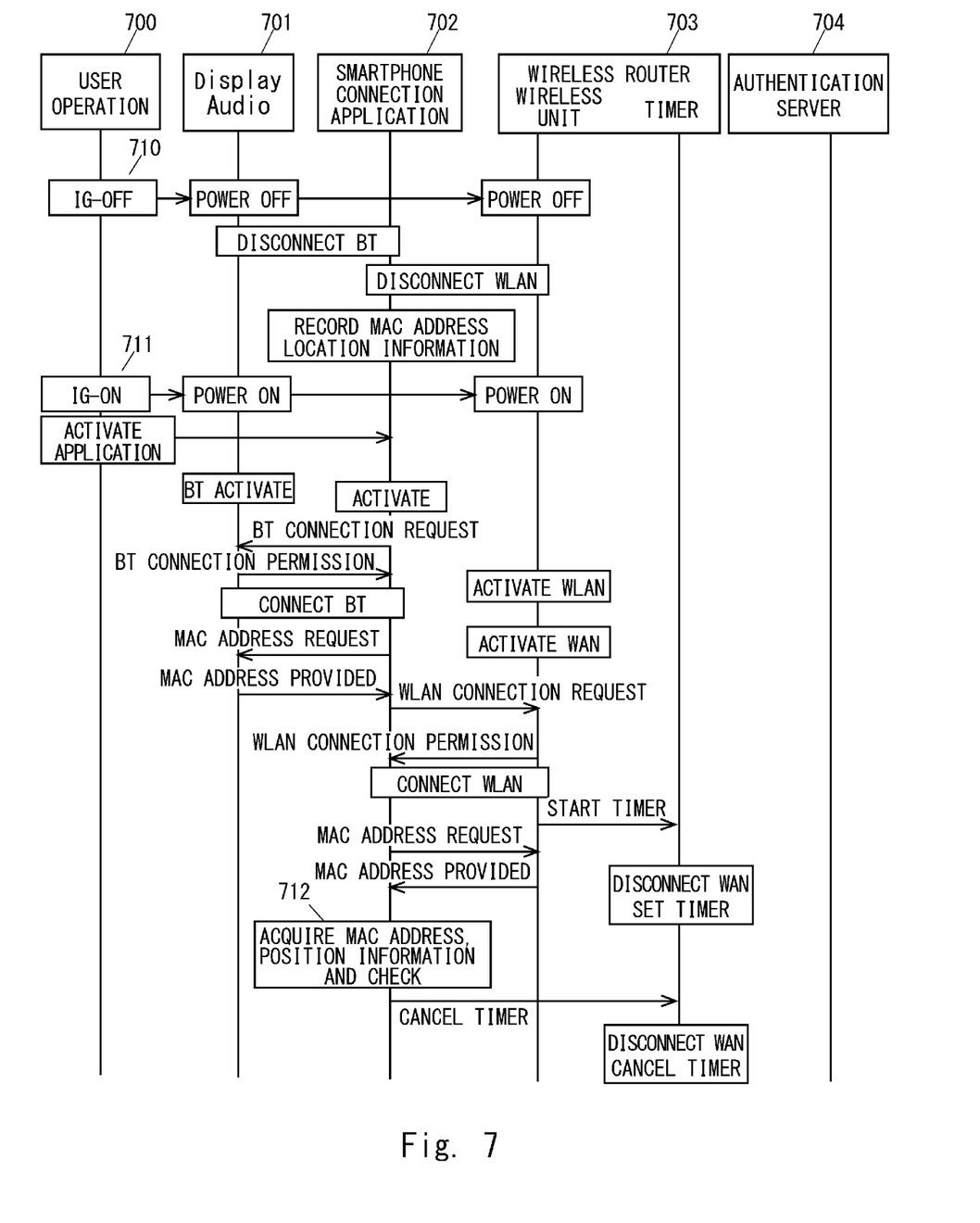
FIG. 7 is a sequence diagram according to a fourth embodiment.

A user operation 700, a Display Audio (DA) 701, a smartphone connection application 702, a wireless router 703, and an authentication server 704 shown in FIG. 7 correspond to the user operation 300, Display Audio 301, smartphone connection application 302, wireless router 303, and authentication server 304 shown in FIG. 3, respectively.

In FIG. 7, when an ignition is turned off (710), the DA 701 and the wireless router 703 are turned off, and Bluetooth and a wireless LAN are disconnected.

When both the Bluetooth connection with the DA 701 and the wireless LAN connection with the wireless router 703 are disconnected, the connection application 702 determines that the engine is stopped, and acquires a MAC address of the DA 701, a MAC address of the wireless router 703, and current location information. A function commonly included in a smartphone is used to obtain the location information. For example, GPS (Global Positioning System) can be used to obtain the location information. It is assumed that, before the connection is disconnected, the authentication is performed by the authentication server 704 using the MAC address of the DA 701 and the MAC address of the wireless router 703.

After that, when the ignition is turned on again (711), the same sequence as that of the first example embodiment is carried out until the MAC address of the DA 701 and the MAC address of the wireless router 703 are acquired.

The connection application 702 acquires the current location information after acquiring the MAC address. When both the Bluetooth and the wireless LAN are disconnected, the MAC address and the location information recorded in the connection application 702 are checked against and compared with each other (712).

If the MAC address of the DA 701, the MAC address of the wireless router 703, and the location information match the recorded MAC addresses and location information, respectively, the connection application 702 determines that there is no change in the authenticated device configuration and that a person has only gotten on or off the vehicle. Therefore, the connection application 702 outputs a signal for canceling the WAN disconnection timer to the wireless router 703 without making an inquiry to the authentication server 704.

Thus, when a person only gets on or off the vehicle, the wireless communication can be continuously used without making an inquiry to the authentication server using the location information.

On the other hand, when the MAC address of the DA 701, the MAC address of the wireless router 703, and the location information after the disconnection do not match the MAC address of the DA 701, the MAC address of the wireless router 703, and the location information before the disconnection, respectively, a sequence for inquiring the authentication server 704 can be executed in a manner similar to the first example embodiment.

Although the present disclosure has been described with reference to the example embodiments, the present disclosure is not limited to the above. The configurations and details of the present disclosure can be modified in various ways that will be understood by those skilled in the art within the scope of the disclosure.

For example, although the terminal in which the connection application is installed is described as a smartphone, it is not limited to a smartphone as long as the terminal can acquire an ID of the user of the terminal, store the MAC address of the DA, store the MAC address of the wireless router, and at least communicate via the wireless router.

In the above example embodiments, the present disclosure has been described as a hardware configuration, but the present disclosure is not limited to this. Any processing other than processing of the timer used in the present disclosure can also be implemented by causing a CPU (Central Processing Unit) to execute a computer program. The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as Mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application claims priority on the basis of Japanese Patent Application No. 2019-099358, filed May 28, 2019, the entire disclosure of which is incorporated herein by reference.

INDUSTRIAL APPLICABILITY

The present disclosure can be used for wireless communication used in association with a mobile body.

REFERENCE SIGNS LIST

100 TERMINAL (SMARTPHONE)
101 CONNECTION APPLICATION
102 KEY DEVICE
103 AUTHENTICATION SERVER
105 WIRELESS ROUTER
200 DISPLAY AUDIO (DA)
201 POWER SUPPLY UNIT
202 DISPLAY AUDIO FUNCTION UNIT (DA FUNCTION UNIT)
203 BLUETOOTH UNIT
204 USB POWER SUPPLY
210 WIRELESS WAN ROUTER
211 MEMORY UNIT
212 WIRELESS LAN COMMUNICATION UNIT
213 WIRELESS WAN COMMUNICATION UNIT
214 POWER SUPPLY UNIT
220 LINKING UNIT
300 USER OPERATION
301 DISPLAY AUDIO (DA)
302 CONNECTION APPLICATION
303 WIRELESS ROUTER
304 AUTHENTICATION SERVER
400 USER OPERATION
401 DISPLAY AUDIO (DA)
402 CONNECTION APPLICATION
403 WIRELESS ROUTER
404 AUTHENTICATION SERVER
600 USER OPERATION
601 DISPLAY AUDIO (DA)
602 CONNECTION APPLICATION
603 WIRELESS ROUTER
604 AUTHENTICATION SERVER
701 DISPLAY AUDIO (DA)
700 USER OPERATION
702 CONNECTION APPLICATION
703 WIRELESS ROUTER
704 AUTHENTICATION SERVER

The invention claimed is:

1. A wireless system comprising:
a terminal owned by a passenger who rides on a vehicle;
a key device mounted on the vehicle and connected to the terminal by a first connection method;
an authentication server configured to return whether or not authentication is successful to the terminal in response to an authentication request from the terminal; and
a wireless router connected to the terminal by a second connection method and that is configured to perform communication from the terminal to the authentication server via a communication line, wherein
the wireless router includes a timer configured to disconnect connection with the communication line when the authentication by the authentication server is not performed within a predetermined time period, and
when the authentication server authenticates the terminal, the timer is cancelled and the connection with the communication line is continued.

2. The wireless system according to claim 1, wherein when the terminal requests the authentication by the authentication server, the terminal is configured to make the authentication request to the authentication server using a MAC address of the key device, a MAC address of the wireless router, and an ID associated with the terminal.

3. The wireless system according to claim 1, wherein the first connection method for connecting the terminal to the key device is Bluetooth connection.

4. The wireless system according to claim 1, wherein the wireless router comprises:
a wireless WAN communication unit configured to connect to a WAN; and
a wireless LAN communication unit configured to connect to a LAN the second connection method for connecting the terminal to the wireless router is a connection via a wireless LAN, and
the terminal is configured to make the authentication request to the authentication server via the WAN connected using the wireless router.

5. The wireless system according to claim 1, wherein the timer is configured to start an operation when connection between the terminal and the key device by the first connection method is disconnected, and
the timer is configured to disconnect connection of the communication by the wireless router when the authentication by the authentication server is not performed within the predetermined time period.

6. The wireless system according to claim 1, wherein the terminal is configured to acquire and store location information and store a MAC address of the key device and a MAC address of the wireless router used for the authentication by the authentication server when connection with the key device is disconnected and the connection with wireless router is disconnected,
when the terminal is connected to the key device and the terminal is connected to the wireless router, the terminal is configured to acquire the MAC address of the key device after connecting, the MAC address of the wireless router after connecting, and the location information after connecting,
the terminal is configured to compare the stored MAC address of the key device, the stored MAC address of the wireless router, and the stored location information with the MAC address of the key device after connecting, the MAC address of the wireless router after connecting, and the location information after connecting, respectively, and
the terminal is configured to cancel the timer without making the authentication request to the authentication server.

7. The wireless system according to claim 1, wherein the timer is a WAN disconnection timer for disconnecting connection with the WAN by the wireless router when the authentication by the authentication server is not performed and the timer is not cancelled within the predetermined time period.

8. The wireless system according to claim 1, wherein the timer is a LAN disconnection timer for disconnecting connection with the LAN by the wireless router when the authentication by the authentication server is not performed and the timer is not cancelled within the predetermined time period.

9. A method of controlling a wireless system comprising:
connecting a key device to a terminal owned by a passenger on a vehicle by a first connection method;
connecting a wireless router to the terminal by a second connection method;
returning, by an authentication server, whether or not authentication is successful to the terminal in response to an authentication request sent from the terminal to the authentication server via a communication line;
when the authentication by the authentication server is not performed within a predetermined time period set by a timer, disconnecting connection with the communication line by the wireless router; and
when the terminal is authenticated by the authentication server, cancelling the timer and continuing the connection with the communication line by the wireless router.

10. A non-transitory computer readable medium storing a control program of a wireless system causing,
when a terminal connected to a key device by a first connection method and connected to a wireless router by a second connection method transmits an authentication request to an authentication server via a communication line and receives a success or a failure of authentication from the authentication server,
the wireless router to execute, when the terminal is authenticated by the authentication server, cancelling an operation of a timer for counting in order to disconnect the communication line when the timer is not cancelling within a predetermined time period.

* * * * *